United States Patent
Sato et al.

(10) Patent No.: US 7,574,062 B2
(45) Date of Patent: Aug. 11, 2009

(54) IMAGE PROCESSING APPARATUS AND METHOD CAPABLE OF FINELY ADJUSTING DATA COMPRESSION RATE

(75) Inventors: Yutaka Sato, Osaka (JP); Yukio Kadowaki, Nara (JP); Kazuhiro Miyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 817 days.

(21) Appl. No.: 10/495,855

(22) PCT Filed: Jun. 3, 2003

(86) PCT No.: PCT/JP03/07034

§ 371 (c)(1),
(2), (4) Date: May 17, 2004

(87) PCT Pub. No.: WO2004/004313

PCT Pub. Date: Jan. 8, 2004

(65) Prior Publication Data

US 2004/0264783 A1 Dec. 30, 2004

(30) Foreign Application Priority Data

Jun. 27, 2002 (JP) ............................ 2002-187543

(51) Int. Cl.
*G06K 9/36* (2006.01)
(52) U.S. Cl. ..................... 382/239; 382/251; 382/232
(58) Field of Classification Search .................. None
See application file for complete search history.

(56) References Cited

U.S. PATENT DOCUMENTS

| 6,408,026 | B1 * | 6/2002 | Tao ..................... 375/240.03 |
| 6,492,916 | B1 * | 12/2002 | Schwartz et al. ............... 341/59 |
| 6,512,792 | B1 * | 1/2003 | Naito ................... 375/240.05 |
| 6,944,350 | B2 * | 9/2005 | Budge et al. ................. 382/240 |
| 7,031,494 | B2 * | 4/2006 | Ray et al. .................... 382/100 |
| 7,035,473 | B1 * | 4/2006 | Zeng et al. ................... 382/251 |
| 7,155,066 | B2 * | 12/2006 | Baharav et al. .............. 382/248 |
| 2001/0036231 | A1 * | 11/2001 | Easwar et al. ........... 375/240.19 |

FOREIGN PATENT DOCUMENTS

| EP | 1158773 A2 | 11/2001 |
| JP | 08149308 | 6/1996 |
| JP | 2001231009 | 8/2001 |
| JP | 2001-298623 | 10/2001 |
| JP | 2002057903 | 2/2002 |

(Continued)

OTHER PUBLICATIONS

Taubman et al., "JPEG 2000, Image Compression Fundamentals, Standards and Practice, Passages", Nov. 21, 2000.

(Continued)

*Primary Examiner*—Bhavesh M Mehta
*Assistant Examiner*—Sean Motsinger
(74) *Attorney, Agent, or Firm*—Cooper & Dunham, LLP (57) ABSTRACT

An image processing apparatus includes a coding part that performs coding on image data based on the result of decomposing the image data into bit planes block by block, and a quantization part that reduces the values of the image data of a predetermined block to be compressed at an increased rate. The quantization part is provided at an earlier stage than the coding part.

12 Claims, 7 Drawing Sheets

FOREIGN PATENT DOCUMENTS

| | | |
|---|---|---|
| JP | 2002135781 | 5/2002 |
| JP | 2002-165098 | 6/2002 |
| JP | 2002369202 | 12/2002 |

OTHER PUBLICATIONS

Marcellin et al., "An overview of quantization in JPEG 2000", Signal Processing Image Communication vol. 17, No. 1, Jan. 2002, pp. 73-82.

Zeng et al., "An overview of the visual optimization tools in JPEG 2000", Signal Processing Image Communication vol. 17, No. 1, Jan. 2002, pp. 85-104.

Matthias Larsson Carlander, "JPEG2000 Verification model 9.1 : visual frequency weighting", ISO/IEC JTC1/SC29/WG1 N2165, Jun. 28, 2001, pp. 200-204.

* cited by examiner

IMAGE PROCESSING APPARATUS AND METHOD CAPABLE OF FINELY ADJUSTING DATA COMPRESSION RATE

TECHNICAL FIELD

The present invention generally relates to image processing apparatuses and methods, and more particularly to an image processing apparatus and method performing coding based on image-related data divided into bit planes.

BACKGROUND ART

Figure 1:
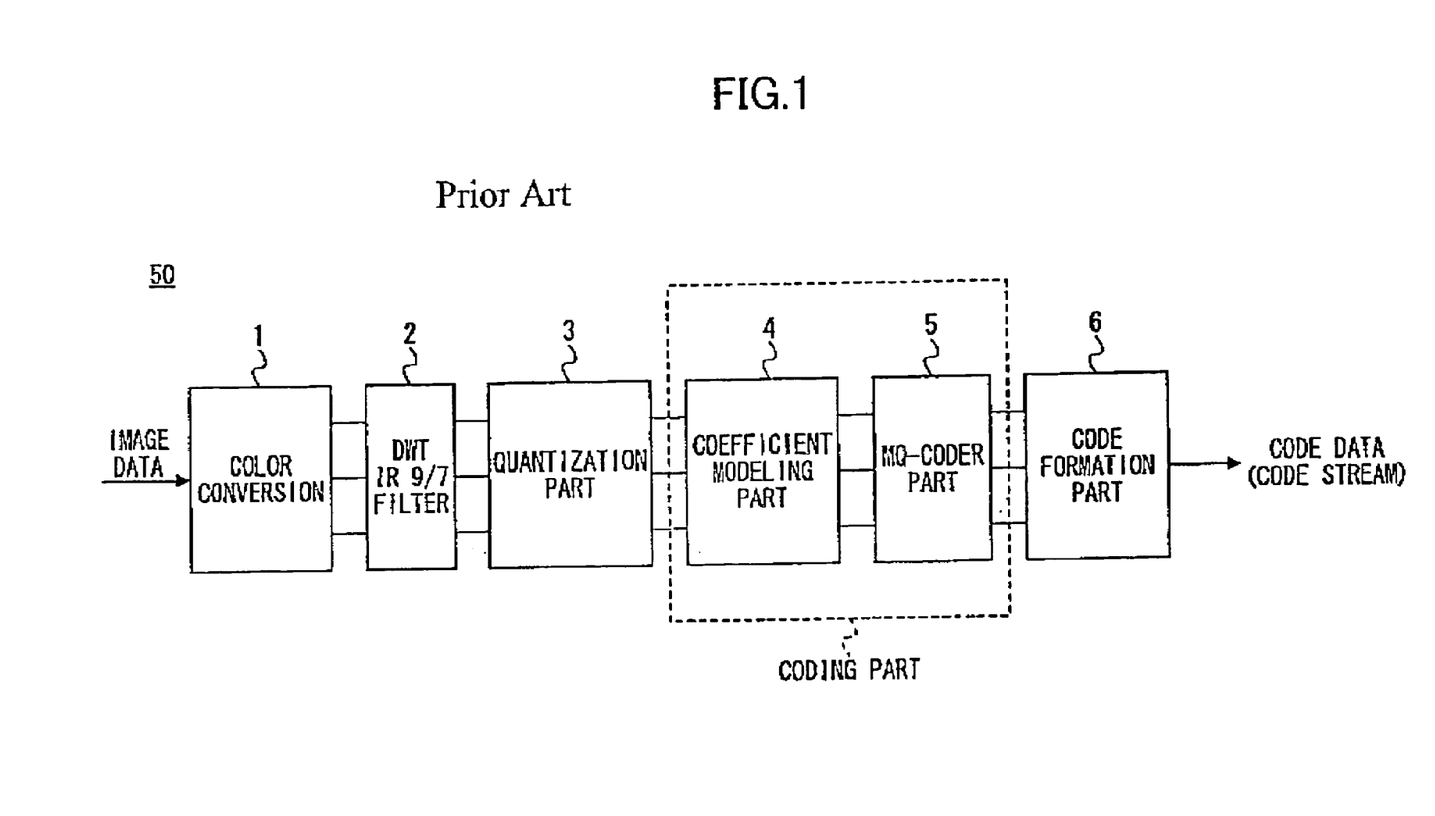
FIG. 1 is a block diagram showing a conventional JPEG 2000-compliant image processing apparatus.

There are conventionally known image processing apparatuses that perform coding based on quantized image data divided into bit planes. Such image processing apparatuses include those in compliance with JPEG 2000, for instance. FIG. 1 is a block diagram showing a JPEG 2000-compliant image processing apparatus 50. In the image processing apparatus 50, first, image data is converted to three signals of Y (luminance), Cr (color difference), and Cb (color difference) in a color conversion part 1. In a discrete wavelet transform (DWT) part 2, the three signals are separately subjected to discrete wavelet transform of level three using an irreversible transform filter called an IR 9/7 filter in JPEG 2000. The wavelet coefficients obtained in the DWT part 2 are subjected to scalar quantization in a quantization part 3.

Next, in a coefficient modeling part 4, the wavelet coefficients are divided into blocks of a predetermined size in each sub-band so that the scalar-quantized data is decomposed, block by block, into bit planes in order from the MSBs (most significant bits) to the LSBs (least significant bits).

Figure 2:
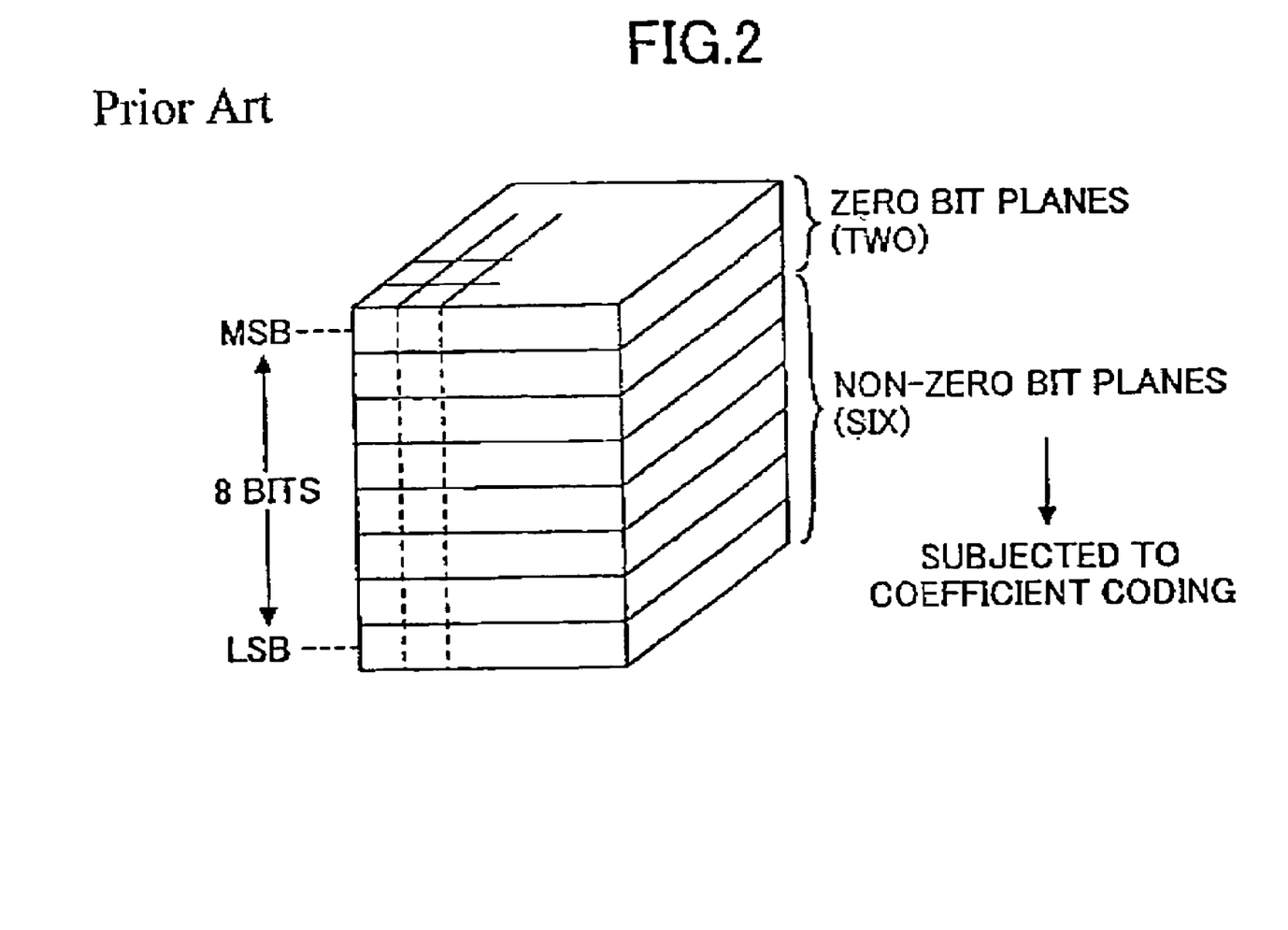
FIG. 2 is a diagram showing a state where the 8-bit wavelet coefficients of a block are decomposed into eight bit planes.

FIG. 2 is a diagram showing a state where the 8-bit wavelet coefficients of a block are decomposed into eight bit planes. The coefficient modeling part 4 codes, or performs coefficient coding on, each of the wavelet coefficients decomposed into the bit planes through three separate coding paths. In the coefficient coding, a higher compression rate is achieved as the bit planes include more data values of "0." Further, the coefficient coding is not performed on a zero bit plane or a bit plane whose data values are all "0s," but is performed after the initial appearance of a bit plane including a significant data value of "1." Therefore, in the state of FIG. 2, the bit planes of the high-order two bits are not subjected to coefficient coding, and only the bit planes of the low-order six bits are subjected to coefficient coding.

An MQ-coder part 5 performs binary arithmetic coding on the image data subjected to the coefficient coding in the coefficient modeling part 4, and outputs the resultant coded data to a code formation part 6.

In the image processing apparatus 50, the coefficient modeling part 4 and the MQ-coder part 5 form a coding part.

The code formation part 6 adds data such as information on the coding to a predetermined part of the coded data obtained in the MQ-coder part 5, thereby forming and outputting a series of coded data called a code stream.

DISCLOSURE OF THE INVENTION

According to the JPEG 2000-compliant coding, in order to achieve a higher compression rate, the data of low-order bit planes of the wavelet coefficients subjected to the coefficient coding of the coefficient modeling part 4 is discarded. According to this method, however, the data values can be changed only by $2^n$, so that the compression rate can be adjusted only roughly.

Accordingly, it is a general object of the present invention to provide an image processing apparatus and method in which the above-described disadvantage is eliminated.

A more specific object of the present invention is to provide an image processing apparatus and method that performs coding on image data based on the result of decomposing the image data into bit planes block by block and can generate coded data at a compression rate more finely adjusted with a simple configuration.

The above objects of the present invention are achieved by an image processing apparatus including: a coding part that performs coding on image data based on a result of decomposing the image data into bit planes block by block; and a quantization part that reduces values of image data of a predetermined block to be compressed at an increased rate, the quantization part being provided at an earlier stage than the coding part.

According to the above-described image processing apparatus, of the values of image data before being subjected to coding, the values of the data of a predetermined block to be compressed at an increased rate are reduced, so that finer adjustment can be performed on the compression rate compared with the case of discarding low-order bit data of the data of the predetermined block.

The above objects of the present invention are also achieved by an image processing method including the steps of (a) performing coding on image data based on a result of decomposing the image data into bit planes block by block; and (b) performing quantization that reduces values of image data of a predetermined block to be compressed at an increased rate before the step (a).

According to the above described image processing method, of the values of image data before being subjected to coding, the values of the data of a predetermined block to be compressed at an increased rate are reduced, so that finer adjustment can be performed on the compression rate compared with the case of discarding low-order bit data of the data of the predetermined block.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION (Entire Configuration)

Figure 3:
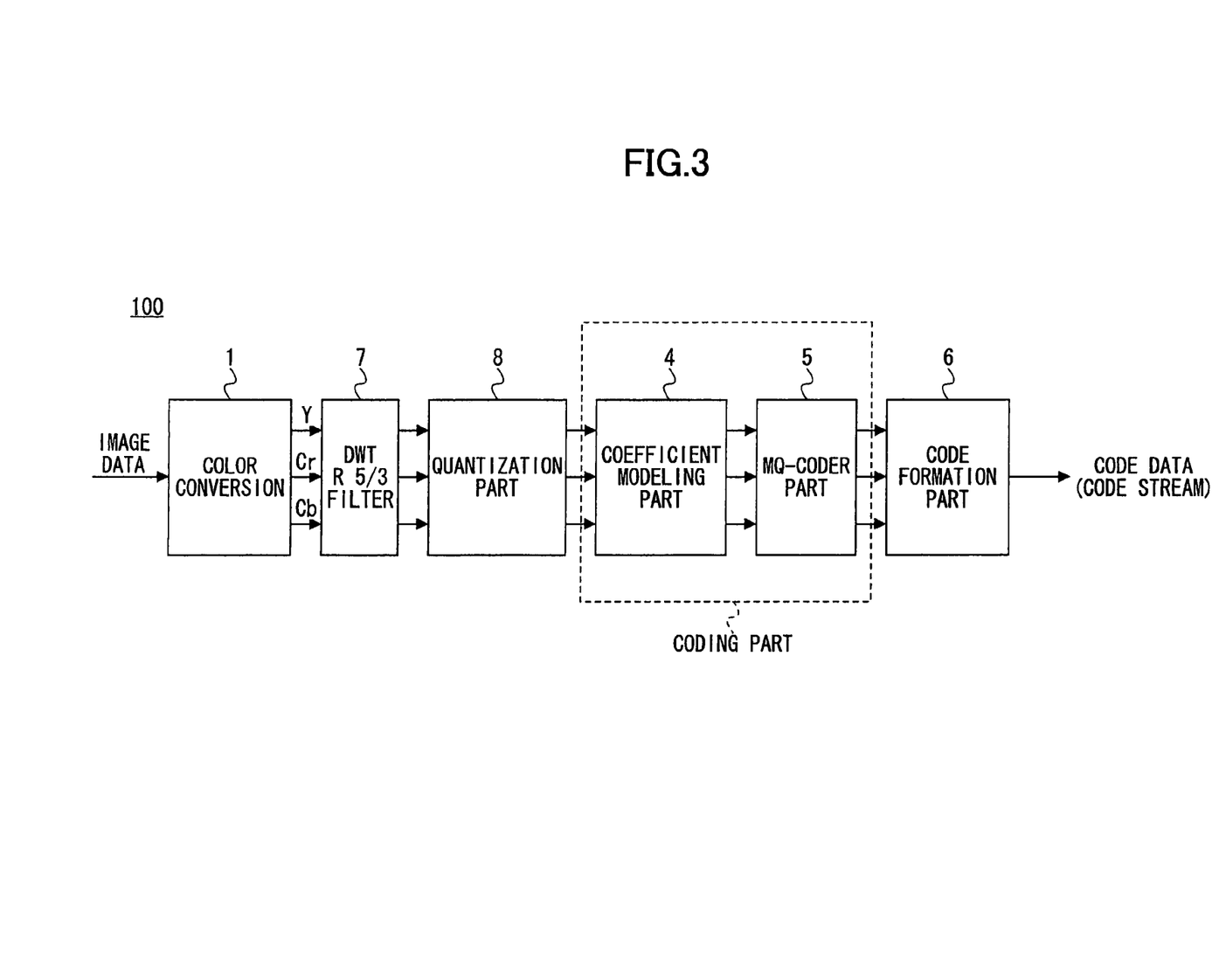
FIG. 3 is a diagram showing a JPEG 2000-compliant image processing apparatus according to an embodiment of the present invention.

A description will now be given, with reference to the accompanying drawings, of an embodiment of the present invention. FIG. 3 is a diagram showing a JPEG 2000-compliant image processing apparatus 100 according to the embodiment of the present invention. The same elements as those of the above-described image processing apparatus 50 are referred to by the same numerals.

Initially, in the color conversion part of the image processing apparatus 100, image data is converted to three signals of Y (luminance), Cr (color difference), and Cb (color difference). Then, in a DWT part 7, the signals are separately subjected to wavelet transform of level 3 using a reversible transform filter called an R 5/3 filter in JPEG 2000.

Figure 4:
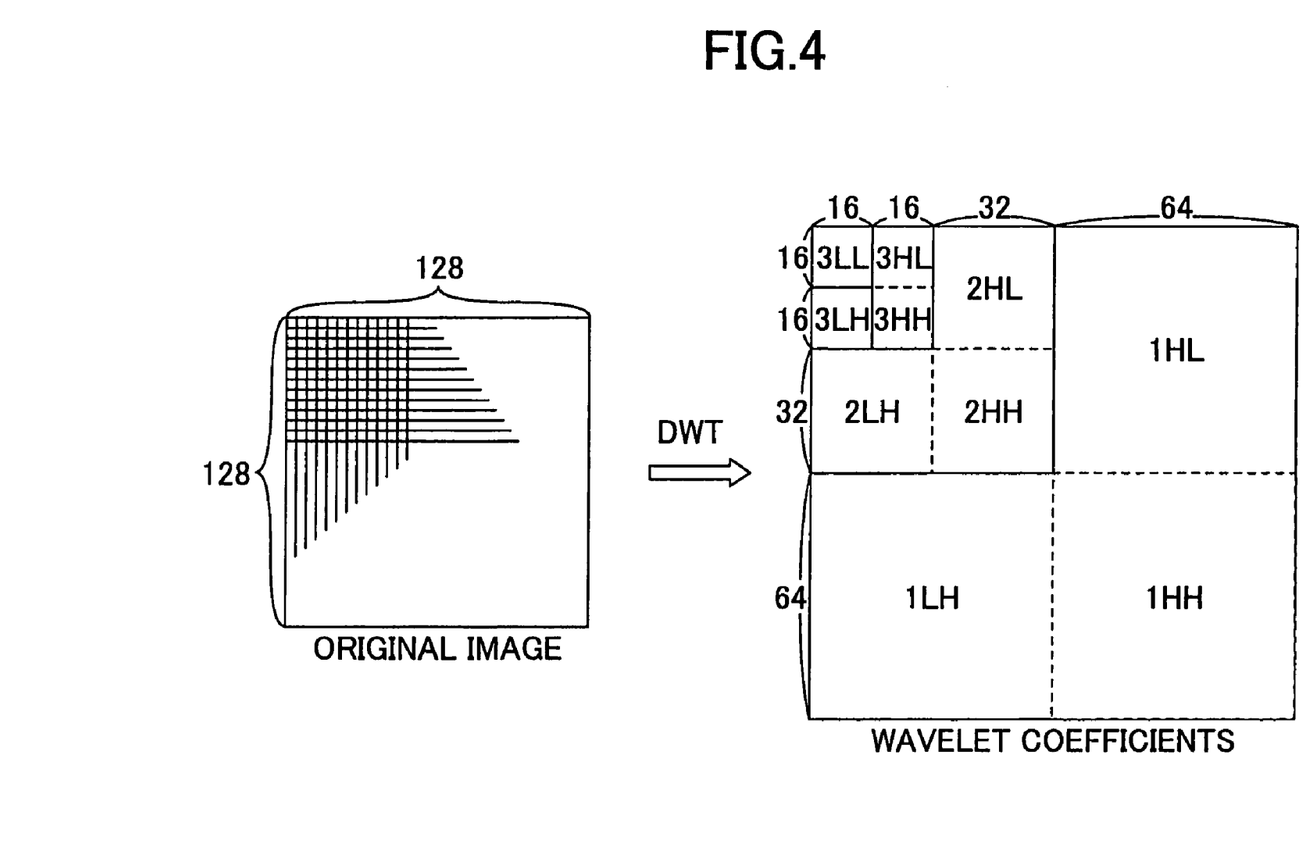
FIG. 4 is a diagram showing wavelet coefficients generated by level-3 discrete wavelet transform (DWT) according to the embodiment of the present invention.

FIG. 4 is a diagram showing the wavelet coefficients generated by the level-3 DWT performed in the DWT part 7 using the reversible transform filter. It is known that of the wavelet coefficients, those of the blocks of low-frequency component sub-bands such as 3LL, 3LH, 3HL, and 3HH relate to the overall contour of a reproduced image and those of the blocks of high-frequency component sub-bands such as 1HH, 1LH, and 1HL relate to the resolution of a reproduced image.

Referring back to FIG. 3, compared with the irreversible transform filter (or IR 9/7 filter in JPEG 2000), the reversible transform filter employed in the DWT part 7 has a simple configuration and can be reduced in size with ease. Therefore, the image processing apparatus 100 can be reduced in size. In the case of employing a reversible transform filter, however, the compression rate is low. Therefore, according to the image processing apparatus 100, the values of the wavelet coefficients of the high-frequency component blocks that have little effect on the quality of a reproduced image are reduced in a below-described quantization part 8 so as to increase the compression rate.

As will be later described in detail, the quantization part 8 reduces the value of each wavelet coefficient by a proportion that becomes smaller for a block of a lower-frequency component and larger for a block of a higher-frequency component. Particularly, the proportion (quantization step) is finer than $2^n$. By this processing, some wavelet coefficients become smaller in value by one or more digits, thereby increasing data values of "0" existing in the bit planes. As a result, the coefficient coding performed in the coefficient modeling part 4 at a later stage achieves a higher compression rate.

The reduction of the values of the wavelet coefficients of the high-frequency component blocks in the quantization part 8 takes advantage of the well-known characteristic that the reduction of the values of the wavelet coefficients of a high-frequency component block does not affect the quality of a reproduced image. Since the quantization part 8 is provided, the compression rate at the time of the coefficient coding performed in the coefficient modeling part 4 can be increased while the degradation of the quality of a reproduced image is prevented. Further, compared with the case of discarding the data of low-order bit planes, finer adjustment can be performed on the compression rate.

In the coefficient modeling part 4, the wavelet coefficients are divided into blocks each of a 16×16 pixel matrix in each sub-band, and the quantized data is decomposed, block by block, into bit planes in order from the MSBs to LSBs. The coefficient modeling part 4 codes, or performs coefficient coding on, each value of the image data decomposed into the bit planes through three separate coding paths. In the coefficient coding, a higher compression rate is achieved as the bit plane includes more data values of "0." Further, the coefficient coding is not performed on a zero bit plane or a bit plane whose data values are all "0s," but is performed after the initial appearance of a bit plane including a significant data value of "1." That is, in the coefficient coding, the compression rate is simply increased as the number of zero bit planes is increased.

The MQ-coder part 5 performs binary arithmetic coding on the image data subjected to the coefficient coding, and outputs the resultant coded data to the code formation part 6.

In the image processing apparatus 100, the coefficient modeling part 4 and the MQ-coder part 5 form a coding part.

The code formation part 6 adds data such as information on the coding to a predetermined part of the coded data obtained in the MQ-coder part 5, thereby forming and outputting a series of coded data called a code stream.

(Configuration of the Quantization Part 8)

Figure 5:
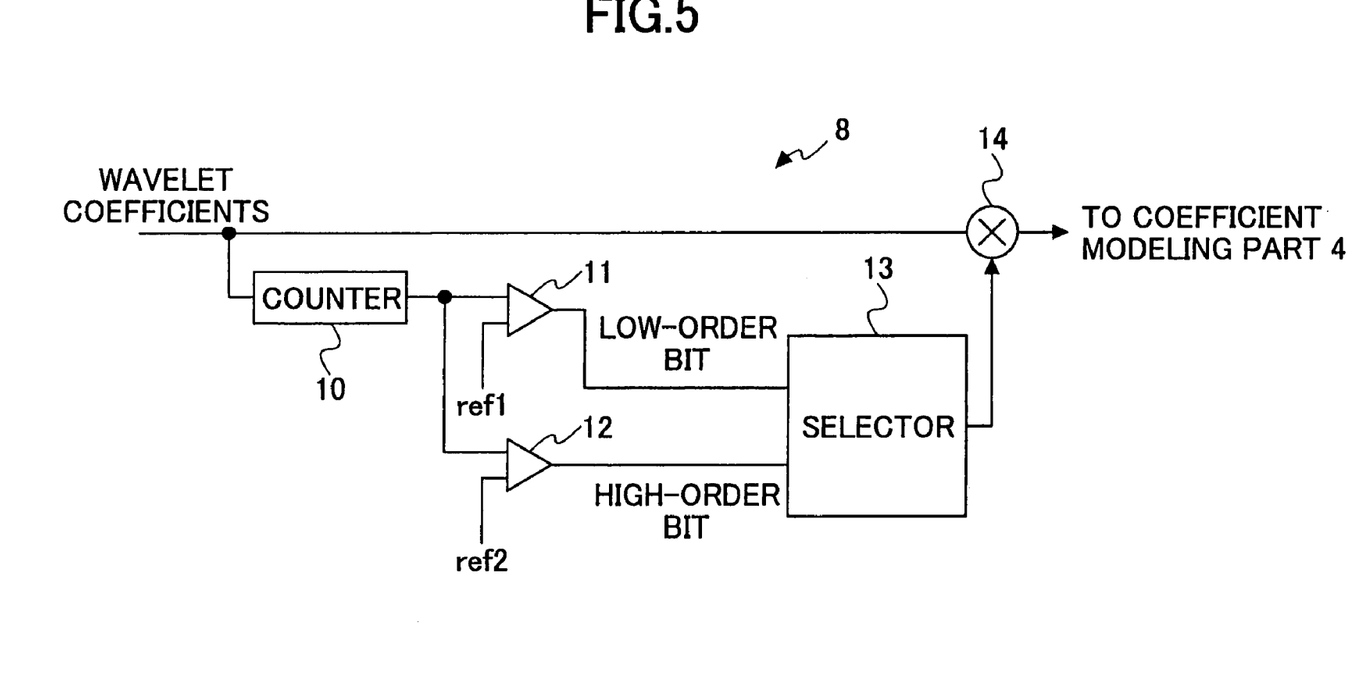
FIG. 5 is a diagram showing a quantization part of the image processing apparatus of FIG. 3 according to the embodiment of the present invention.

FIG. 5 is a diagram showing a configuration of the quantization part 8. In the quantization part 8, the values of the wavelet coefficients are reduced by a proportion that increases so as to be the smallest for the low-frequency component blocks (3LL, 3LH, 3HL, and 3HH) and the largest for the high-frequency component blocks (1LH, 1HL, 1HH). The wavelet coefficients input to the quantization part 8 are input to a counter 10 and a multiplier 14.

The count value of the counter 10 is input to a comparator 11 via one of a pair of the terminals thereof and to a comparator 12 via one of a pair of the terminals thereof. The other terminal of the comparator 11 is set to ref 1 corresponding to the number of wavelet coefficients, that is, the number of pixels, of the 3LL, 3LH, 3HL, and 3HH blocks (16 ×16× 4=1024). Further, the other terminal of the comparator 12 is set to ref 2 corresponding to the number of wavelet coefficients, that is, the number of pixels, of the 2LL (3LL, 3LH, 3HL, and 3HH), 2LH, 2HL, and 2HH blocks (1024 +32× 32×3 4096).

When the count value of the counter 10 reaches ref 1, the level of the output signal of the comparator 11 switches from LOW to HIGH. When the count value of the counter 10 reaches ref 2, the level of the output signal of the comparator 12 switches from LOW to HIGH. The output signals of the comparators 11 and 12 are input to a selector 13 as the low-order bit signal and the high-order bit signal, respectively, of a two-bit selection signal. When the input two-bit selection signal is "00," the selector 13 outputs a multiplier of 1.0 to the multiplier 14. In the case of "01," the selector 13 outputs a multiplier of 0.9 to the multiplier 14. In the case of "11," the selector 13 outputs a multiplier of 0.6 to the multiplier 14.

According to the quantization part 8 of the above-described configuration, the wavelet coefficients of the low-frequency component blocks (3LL, 3LH, 3HL, and 3HH) are output directly to the coefficient modeling part 4, the wavelet coefficients of the blocks of the middle frequency range (2LH, 2HL, and 2HH) are output to the coefficient modeling part 4 after being multiplied by 0.9, and the wavelet coefficients of the high-frequency component blocks (1LH, 1HL, and 1HH) are output to the coefficient modeling part 4 after being multiplied by 0.6.

When it is taken into consideration that in the coefficient modeling part 4, the coefficient coding is not performed on a zero bit plane whose data values are all "0s" but is performed after the initial appearance of a bit plane including a significant data value of "1," the wavelet coefficients of the high-frequency component blocks (1LH, 1HL, and 1HH) may be reduced in value by one or more digits by multiplying the wavelet coefficients by a value less than or equal to 0.5 so that an increased number of zero bit planes are formed in succession from the MSB plane toward a lower-order bit plane. Consequently, the coefficient coding can be performed on the high-frequency component blocks with more efficiency.

Figure 6:
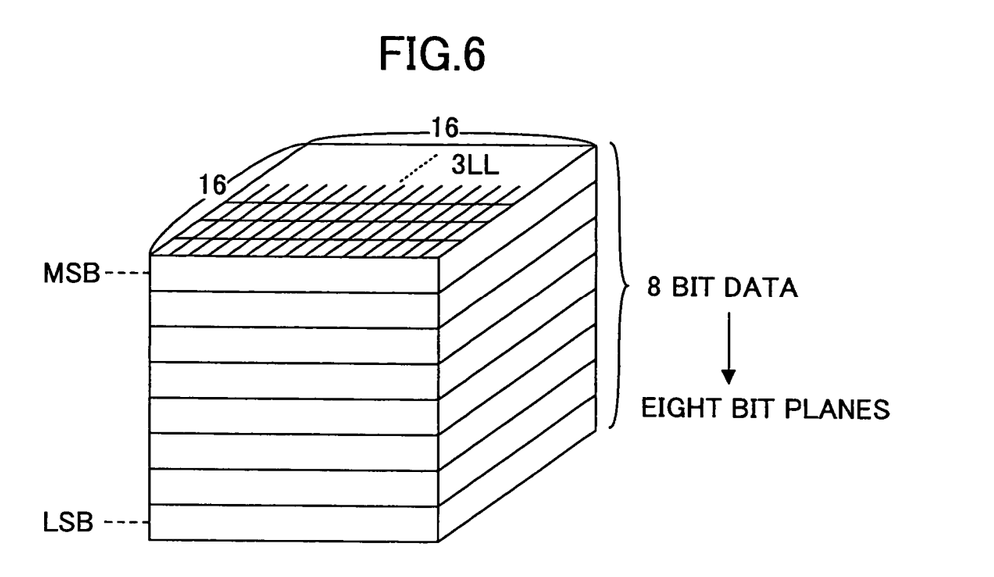
FIG. 6 is a diagram showing a state where the wavelet coefficients of a block are divided into bit planes according to the embodiment of the present invention.

FIG. 6 is a diagram showing a state where the quantized wavelet coefficients of the 3LL block of a 16×16 pixel matrix are divided into bit planes in order from their MSBs to LSBs. As shown in FIG. 6, in the case of 8-bit wavelet coefficients, the wavelet coefficients are divided into eight bit planes.

Figure 7:
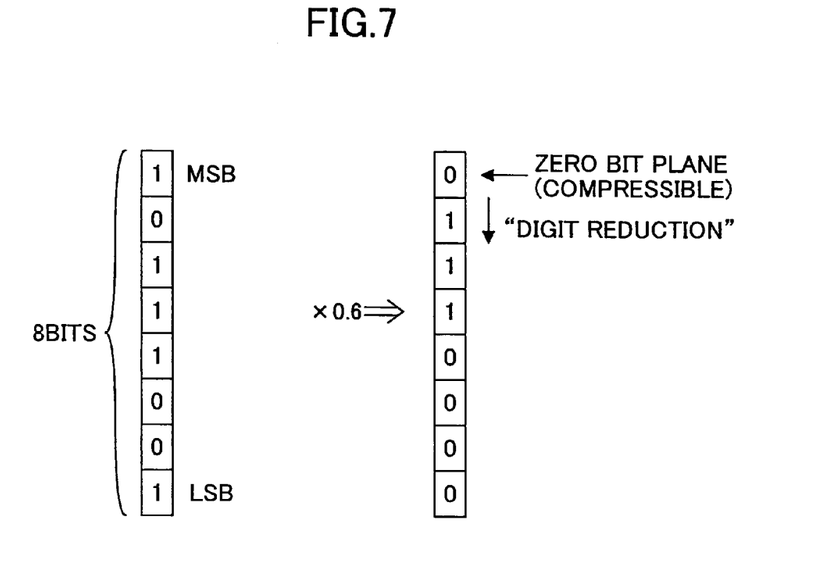
FIG. 7 is a diagram showing "digit reduction" caused by reducing a wavelet coefficient by a proportion.

FIG. 7 is a diagram showing the case of reducing a wavelet coefficient of a 1LL block in value by a digit by multiplying the coefficient by 0.6 in the quantization part 8. In this case, "10111001" multiplied by 0.6 is "01110000." As a result, "digit reduction" occurs so that the value of the MSB of the coefficient changes from "1" to "0." As previously described, the coefficient modeling part 4 performs coefficient coding on each value of the image data decomposed into the bit planes through three separate coding paths. At this point, the compression rate can be increased as the bit planes include more data values of "0." Further, the coefficient coding is not performed on a zero bit plane whose data values are all "0s" but is performed after the initial appearance of a bit plane including a significant data value of "1." That is, by particularly reducing the wavelet coefficients of high-frequency component blocks by a large proportion, the number of zero bit planes is increased, so that the compression rate is increased.

As described above, the image processing apparatus 100 of this embodiment, which employs the DWT part 7 using a reversible transform filter simple in configuration and reducible in size, reduces the values of the wavelet coefficients of high-frequency component blocks having little effect on the quality of a reproduced image in the quantization part 8. Consequently, the compression rate of coded data is increased, and finer adjustment can be performed on the compression rate than in the case of adjusting the compression rate by discarding the data of low-order bits of the wavelet coefficients.

The image processing apparatus 100 of this embodiment is applicable to apparatuses including a digital still camera, the recording part of a digital copier, a monitor camera, a digital video storage device, and a digital camera (for moving pictures).

The present invention is not limited to the specifically disclosed embodiment, but variations and modifications may be made without departing from the scope of the present invention.

The present application is based on Japanese priority application No. 2002-187543 filed on Jun. 27, 2002, the entire contents of which are hereby incorporated by reference.

The invention claimed is:

1. An image processing apparatus comprising:
   a coding part that performs coding on image data based on a result or decomposing the image data into bit planes block by block;
   a quantization part that reduces values of image data of a predetermined block to be compressed at an increased rate, the quantization part being provided at an earlier stage than the coding part; and
   a transform part configured to perform a discrete wavelet transform to said image data to obtain wavelet coefficients including first blocks of higher-frequency components and second blocks of lower-frequency components,
   wherein said quantization part includes a multiplier part configured to multiply a wavelet coefficient by a scaling factor,
   wherein said multiplier part multiplies wavelet coefficients in said second blocks of lower-frequency components by a second scaling factor, and multiplies wavelet coefficients in the blocks of higher-frequency components by a first scaling factor that is lower than said second scaling factor applied to wavelet coefficients in said second blocks of lower-frequency components, and
   wherein the quantization part further comprises:
   a counter configured to receive said wavelet coefficients and output a count value;
   a first comparator configured to receive said count value and a first reference value and output a first comparator signal;
   a second comparator configured to receive said count value and a second reference value and output a second comparator signal; and
   a selector configured to receive the first comparator signal and the second comparator signal, and outputs a scaling factor to said multiplier part in accordance with the first comparator signal and the second comparator signal.

2. The image processing apparatus as claimed in claim 1, wherein:
   said quantization pan reduces the values of the image data of the predetermined block so that bit planes of the values of the image data of the predetermined block are generated with an increased number of zero bit planes whose data values are all binary Os being formed in succession from a most-significant-bit plane toward a lower-order bit plane; and
   the coding part performs the coding on the bit planes of the image data of the predetermined block except for the zero bit planes.

3. The image processing apparatus as claimed in claim 1, wherein said quantization part reduces said wavelet coefficients in value by a proportion that increases for a block of a higher-frequency component and decreases for a block of a lower-frequency component.

4. An image processing apparatus comprising:
   a coding part that performs coding on image data based on a result of decomposing the image data into bit planes block by block;
   a quantization part that reduces values of image data of a predetermined block to be compressed at an increased rate, the quantization part being provided at an earlier stage than the coding part; and
   a discrete wavelet transform part including a reversible transform filter to perform discrete wavelet transform on the image data to obtain wavelet coefficients including first blocks of higher-frequency components and second blocks of lower-frequency components, wherein:
   said quantization part includes a multiplier pan configured to multiply a wavelet coefficient by a scaling factor,
   said multiplier part multiplies wavelet coefficients in said second blocks of lower-frequency components by a second scaling factor, and multiplies wavelet coefficients in the blocks of higher-frequency components by a first scaling factor that is lower than the second scaling factor applied to wavelet coefficients in said second blocks of lower-frequency components, and
   wherein the quantization part further comprises:
   a counter configured to receive said wavelet coefficients and output a count value;
   a first comparator configured to receive said count value and a first reference value and output a first comparator signal;

a second comparator configured to receive said count value and a second reference value and output a second comparator signal; and a selector configured to receive the first comparator signal and the second comparator Signal, and outputs a scaling factor to said multiplier part in accordance with the first comparator signal and the second comparator signal.

5. An image processing method, comprising the steps of:

(a) performing coding on image data based on a result of decomposing the image data into bit planes block by block;

(b) performing quantization before said step (a); and (c) performing a discrete wavelet transform to said image data to obtain wavelet coefficients including first blocks of higher-frequency components and second blocks of lower-frequency components, prior to step (by, wherein in said quantization in step (b), wavelet coefficients in said second blocks of lower-frequency components are multiplied by a second scaling factor, and wavelet coefficients in the first blocks of higher-frequency components are multiplied by a first scaling factor that is lower than said second scaling factor applied to the wavelet coefficients in said second blocks of lower-frequency components, and wherein the quantization step (b) further comprises:

receiving said wavelet coefficients and outputting a count value;

receiving said count value and a first reference value and outputting a first comparator signal;

receiving said count value and a second reference value and outputting a second comparator signal; and receiving the first comparator signal and the second comparator signal, and outputting a scaling factor in accordance with the first comparator signal and the second comparator signal.

6. The image processing method as claimed in claim 5, wherein:

said step (b) reduces the values of the image the data of the predetermined block so that bit planes of the values of the image data of the predetermined block are generated with an increased number of zero bit planes whose data values are all binary 0s being formed in succession from a most-significant-bit plane toward a lower-order bit plane; and said step (a) performs the coding on the bit planes of the image data of the predetermined block except for the zero bit planes.

7. The image processing method as claimed in claim 5, wherein said quantization in step (b) reduces said wavelet coefficients in value by a proportion that increases for a block of a higher-frequency component and decreases for a block of a lower-frequency component.

8. The image processing method as claimed in claim 5, wherein a reversible transform filter is used in step (c) to perform said discrete wavelet transform on the image data and said quantization in step (b) reduces said wavelet coefficients in value by a proportion that increases for a block of a higher-frequency component and decreases for a block of a lower-frequency component.

9. The image processing apparatus as claimed in claim 4, wherein:

said wavelet coefficients obtained by said transform part includes first blocks of high-frequency components, said second blocks of middle-frequency components and third blocks of low-frequency components, and said quantization part outputs wavelet coefficients in said third blocks of low-frequency component directly to the coding part, outputs wavelet coefficients of the second blocks of middle-frequency components to the coding part after being slightly reduced, and outputs wavelet coefficients of the first blocks of high-frequency components to the coding part after being reduced by a greater amount than the wavelet coefficients of the second blocks of middle-frequency components.

10. The image processing apparatus as claimed in claim 9, wherein the first reference value corresponds to a first number of wavelet coefficients in the third blocks of low-frequency components, and the second reference value corresponds to a second number of wavelet coefficients in the second blocks of middle-frequency components.

11. The image processing apparatus as claimed in claim 9, wherein if the selector receives a first predetermined combination of values of the first comparator signal and the second comparator signal, then the selector outputs said first scaling factor of a first predetermined value, and if the selector receives a second predetermined combination of values of the first comparator signal and the second comparator signal, then the selector outputs said second scaling factor of a second predetermined value, and if the selector receives a third predetermined combination of values of the first comparator signal and the second comparator signal, then the selector outputs a third scaling factor of a third predetermined value.

12. The image processing apparatus as claimed in claim 11, wherein the first scaling factor is set equal to said first predetermined value and the second scaling factor is set equal to said second predetermined value.

* * * * *